(12) United States Patent
Hakamata et al.

(10) Patent No.: US 7,184,085 B2
(45) Date of Patent: Feb. 27, 2007

(54) CHARGE MULTIPLYING SOLID-STATE ELECTRONIC IMAGE SENSING DEVICE AND METHOD OF CONTROLLING SAME

(75) Inventors: Kazuo Hakamata, Ashigarakami-gun (JP); Takashi Shoji, Ashigarakami-gun (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 917 days.

(21) Appl. No.: 10/218,416

(22) Filed: Aug. 15, 2002

(65) Prior Publication Data

US 2003/0035057 A1     Feb. 20, 2003

(30) Foreign Application Priority Data

Aug. 20, 2001   (JP)   .............................. 2001-249385

(51) Int. Cl.
  *H04N 3/14*   (2006.01)
  *H04N 5/335*  (2006.01)
(52) U.S. Cl. ........................ 348/311; 348/45; 348/65; 396/17; 600/109; 600/101; 600/118
(58) Field of Classification Search ................ 348/45, 348/65, 76, 216.1, 311; 396/17; 600/101, 600/109, 110, 111, 112, 118
See application file for complete search history.

(56) References Cited

U.S. PATENT DOCUMENTS

| | | | | |
|---|---|---|---|---|
| 5,652,442 A | * | 7/1997 | Roks | 257/239 |
| 5,867,215 A | * | 2/1999 | Kaplan | 348/315 |
| 6,198,507 B1 | * | 3/2001 | Ishigami | 348/273 |
| 6,410,905 B1 | * | 6/2002 | Heidtmann et al. | 250/214.1 |
| 6,602,186 B1 | * | 8/2003 | Sugimoto et al. | 600/126 |
| 6,902,527 B1 | * | 6/2005 | Doguchi et al. | 600/109 |
| 2002/0126213 A1 | * | 9/2002 | Hynecek | 348/241 |
| 2002/0191093 A1 | * | 12/2002 | Hynecek | 348/311 |

* cited by examiner

*Primary Examiner*—Vivek Srivastava
*Assistant Examiner*—Nelson D. Hernandez
(74) *Attorney, Agent, or Firm*—Sughrue Mion, PLLC (57) ABSTRACT

Signal charge that has accumulated in photodiodes of a photoreceptor area in a CCD is multiplied by a charge multiplier and then applied to a floating diffusion amplifier, which has been set to a small conversion coefficient, or to floating gate amplifier, which has been set to a large conversion coefficient. If the accumulated amount of signal charge is small, the charge is converted to a video signal by the floating gate amplifier having the large conversion coefficient. If the accumulated amount of signal charge is large, the charge is converted to a video signal by the floating diffusion amplifier having the small conversion coefficient. Thus a video signal having a high level is obtained even if the amount of signal charge is small. Since it is unnecessary to change driving pulses that are applied to the charge multiplier, the multiplication factor of the charge multiplier will not fluctuate.

6 Claims, 5 Drawing Sheets

CHARGE MULTIPLYING SOLID-STATE ELECTRONIC IMAGE SENSING DEVICE AND METHOD OF CONTROLLING SAME

BACKGROUND OF THE INVENTION

1. Field of the Invention

This invention relates to a charge multiplying solid-state electronic image sensing device, a method of controlling the device, and an endoscope apparatus that uses this charge multiplying solid-state electronic image sensing device.

2. Description of the Related Art

A charge multiplying solid-state electronic image sensing device has a charge multiplier possessing a number of stages. By applying charge multiplying drive pulses to the charge multiplier, electric charge that has accumulated in photodiodes is multiplied and output.

The overall multiplication factor of the charge multiplier is decided by the charge multiplication factor per stage and the total number of stages of the charge multiplier. This means that a fluctuation in the charge multiplication factor per stage appears as a large fluctuation in the overall multiplication factor of the charge multiplier. For example, assume that the charge multiplication factor per stage is 1.00854 and that the number of stages of the charge multiplier is 400. In order to hold a variation in the overall multiplication factor of the charge multiplier to a value below several percent, it is required that the fluctuation in the charge multiplication factor per stage be held to a small 0.1% owing to a fluctuation in the charge multiplying drive pulses applied to the charge multiplier. Suppressing a fluctuation in the charge multiplication factor per stage to 0.1% is very difficult.

A charge multiplying solid-state electronic image sensing device sometimes is utilized in an endoscope apparatus owing to its ability to detect extremely weak light. In an endoscope apparatus, internal tissue is illuminated by white light in an ordinary observation mode until the tip of the scope reaches internal tissue deemed to be the affected area. When the internal tissue deemed to be the affected area is ascertained, the mode is switched over to a fluorescent observation mode and the internal tissue is illuminated with excitation light. As compared with the ordinary observation mode, in the fluorescent observation mode an extremely faint fluorescent image must be sensed. For this reason, a charge multiplying solid-state electronic image sensing device that is capable of detecting very faint light is used in an endoscope.

In an endoscope apparatus, the level of the charge multiplying drive pulses is changed in response to mode changeover. That is, in the fluorescent observation mode, the level of the charge multiplying drive pulses is raised to increase the multiplication factor because only a small amount of signal charge can be stored and, hence, the video signal level is low in this mode. When the level of the charge multiplying drive pulses is changed, however, a fluctuation is produced in the charge multiplying drive pulses at the time of the change. As a consequence, a variation in the overall multiplication factor of the charge multiplier cannot be ignored.

DISCLOSURE OF THE INVENTION

Accordingly, an object of the present invention is to so arrange it that a variation will not be produced in a charge multiplier when the operating mode is changed over.

According to a first aspect of the present invention, the foregoing object is attained by providing a charge multiplying solid-state electronic image sensing device comprising: a number of photoelectric transducers for storing signal charge in accordance with amount of incident light; a read-out device for reading out signal charge that has been stored in the photoelectric transducers; a charge multiplier for transferring the signal charge, which has been read out by the read-out device, while multiplying the electric charge; and a converter for converting the signal charge, which has been transferred through the charge multiplier, to a video signal in accordance with a first conversion coefficient in response to setting of a first mode, and to a video signal in accordance with a second conversion coefficient, which is different from the first conversion coefficient, in response to setting of a second mode.

The first aspect of the present invention also provides a control method suited to the above-described charge multiplying solid-state electronic image sensing device. Specifically, the present invention provides a method of controlling a charge multiplying solid-state electronic image sensing device having a number of photoelectric transducers for storing signal charge in accordance with amount of incident light, a read-out device for reading out signal charge that has been stored in the photoelectric transducers, and a charge multiplier for transferring the signal charge, which has been read out by the read-out device, while multiplying the electric charge, the method comprising the steps of: converting the signal charge, which has been transferred through the charge multiplier, to a video signal in accordance with a first conversion coefficient in response to setting of a first mode, and converting the signal charge, which has been transferred through the charge multiplier, to a video signal in accordance with a second conversion coefficient, which is different from the first conversion coefficient, in response to setting of a second mode.

In accordance with the first aspect of the present invention, signal charge that has been transferred through a charge multiplier is converted to a video signal in accordance with a first conversion coefficient if a first mode has been set, and signal charge that has been transferred through the charge multiplier is converted to a video signal in accordance with a second conversion coefficient, which is different from the first conversion coefficient, if a second mode has been set. It is unnecessary to change charge multiplying drive pulses, which are applied to the charge multiplier, in response to switching between the first and second modes. As a consequence, there is no fluctuation produced in the charge multiplying drive pulses and, hence, there is also no accompanying fluctuation in the multiplication factor of the charge multiplier.

The converter comprises two floating gate amplifying circuits for performing a conversion in accordance with the first and second conversion coefficients, or a floating gate amplifying circuit having the first conversion coefficient and a floating diffusion amplifying circuit having the second conversion coefficient.

The device may further comprise a calculation unit for calculating amount of signal charge that has been stored in the photoelectric transducers based upon two video signals resulting from the conversion performed by the converter, the first conversion coefficient, the second conversion coefficient and number of multiplying stages of the charge multiplier. Since unmagnified detected charge is calculated with regard to an unintended fluctuation in driving pulses, it is also possible to eliminate unintended fluctuation in multiplication factor.

The photoelectric transducers, read-out device (vertical transfer lines and horizontal transfer line, etc.), charge multiplier and floating gate amplifying circuits that construct the charge multiplying solid-state electronic image sensing device may be formed on one substrate. Alternatively, the floating gate amplifying circuits may be provided externally of the substrate. In a case where there are a plurality of floating gate amplifying circuits, some may be formed on the substrate and some provided externally of the substrate. The calculation device similarly may be provided on the substrate or may be provided externally of the substrate.

The above-described charge multiplying solid-state electronic image sensing device can also be used in an endoscope. Specifically, according to a second aspect of the present invention, there is provided an endoscope apparatus comprising: an excitation light source for emitting excitation light of a wavelength within an excitation-wavelength region of internal tissue, which produces fluorescence, in response to setting of a fluorescent observation mode; a white-light source for emitting white light in response to setting of an ordinary observation mode; and a solid-state electronic image sensing device, which receives fluorescent light emitted from the internal tissue owing to illumination of the internal tissue with the excitation light, or reflected light from the internal tissue owing to illumination of the internal tissue with the white light, for outputting a video signal representing an image of the internal tissue; wherein the charge multiplying solid-state electronic image sensing device described above in accordance with the first aspect of the present invention is used as the solid-state electronic image sensing device, an output from the charge multiplying solid-state electronic image sensing device being selected in such a manner that the larger of the first and second conversion coefficients is adopted in response to setting of the fluorescent observation mode and the smaller of the first and second conversion coefficients is adopted in response to setting of the ordinary observation mode.

In this case also it is unnecessary to change the charge multiplying drive pulses, which are applied to the charge multiplier, in response to changeover between the fluorescent observation mode and ordinary observation mode. As a consequence, there is no fluctuation produced in the charge multiplying drive pulses and, hence, there is also no accompanying fluctuation in the multiplication factor. Furthermore, it is possible to calculate the charge multiplication factor per stage of the multiplier in addition to the amount of signal charge that has accumulated in the photoelectric transducers without any influence from a fluctuation in charge multiplication factor due to element temperature. The element temperature can be estimated from the charge multiplication factor that has been calculated.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will be described in detail with reference to the drawings.

Figure 1:
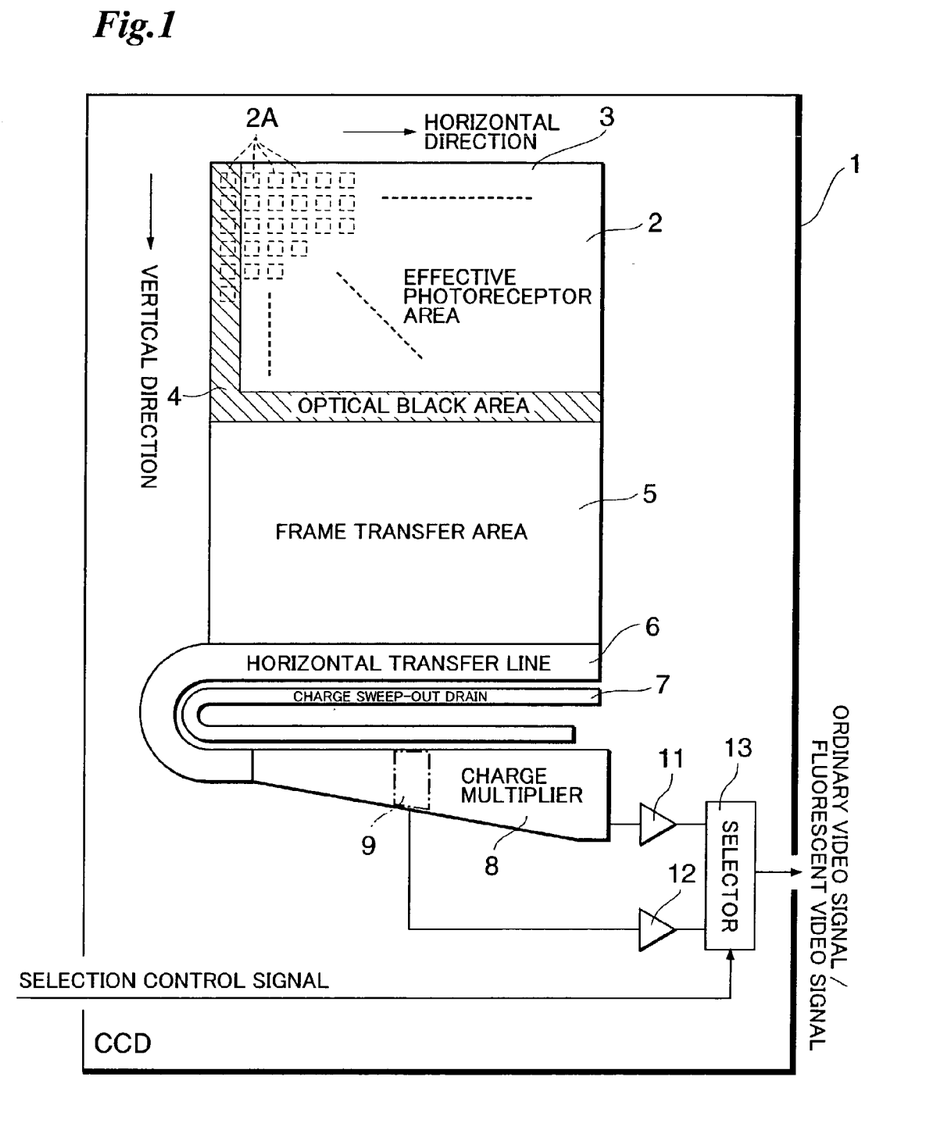
FIG. 1 is a diagram illustrating the structure of a CCD according to a first embodiment of the present invention.

FIG. 1 is a block diagram illustrating the structure of a charge multiplying solid-state electronic image sensing device 1 according to a first embodiment of the present invention.

As shown in FIG. 1, the charge multiplying solid-state electronic image sensing device 1 includes an FDA (floating diffusion amplifier) 11 and an FGA (floating gate amplifier) 12, which are for converting signal charge to a video signal (i.e., for converting electric charge to voltage). The conversion coefficients of the FDA 11 and FGA 12 differ from each other. The output of the FDA 11 or FGA 12 is selected in dependence upon the mode that has been set. The output of the selected amplifier, regardless of the size of the conversion coefficient, is converted to a video signal.

The charge multiplying solid-state electronic image sensing device 1 has a photoreceptor area 2 and a frame transfer area 5. A number of photodiodes 2A are arrayed in the photoreceptor area 2 in horizontal and vertical directions. Substantially the entire area of the photoreceptor area 2 constitutes an effective photoreceptor area 3 for effectively receiving incident light. A portion on the left side of the photoreceptor area 2 and a portion on the lower side thereof form an optical black area 4 that is shielded. The frame transfer area 5, which is shielded from light, transfers signal charge, which has accumulated in the photodiodes 2A of the photoreceptor area 2, in the vertical direction. (The frame transfer area 5 is constituted by vertical transfer lines.).

A horizontal transfer line 6 is provided below (on the output side of) the frame transfer area 5. By applying horizontal transfer pulses to the horizontal transfer line 6, signal charge that has been transferred from the frame transfer area 5 is transferred in the horizontal direction. A charge sweep-out drain 7 for sweeping out unnecessary signal charge is formed in parallel with the horizontal transfer line 6.

A charge multiplier 8 having a number of stages is connected to the output side of the horizontal transfer line 6. Charge multiplying drive pulses are applied to the charge multiplier 8. Signal charge that has been input to the charge multiplier 8 is transferred one stage at a time while being magnified by the charge multiplying drive pulses. A floating gate electrode 9 is formed approximately intermediate the charge multiplier 8. The floating gate electrode 9 supplies the FGA 12 with a signal representing the intermediate output of the charge multiplier 8. The output signals of the FDA 11 and FGA 12 are applied to a selector 13. In response to application of a selection control signal applied thereto, the selector 13 delivers the output signal of the FDA 11 or the output signal of the FGA 12.

Figure 2:
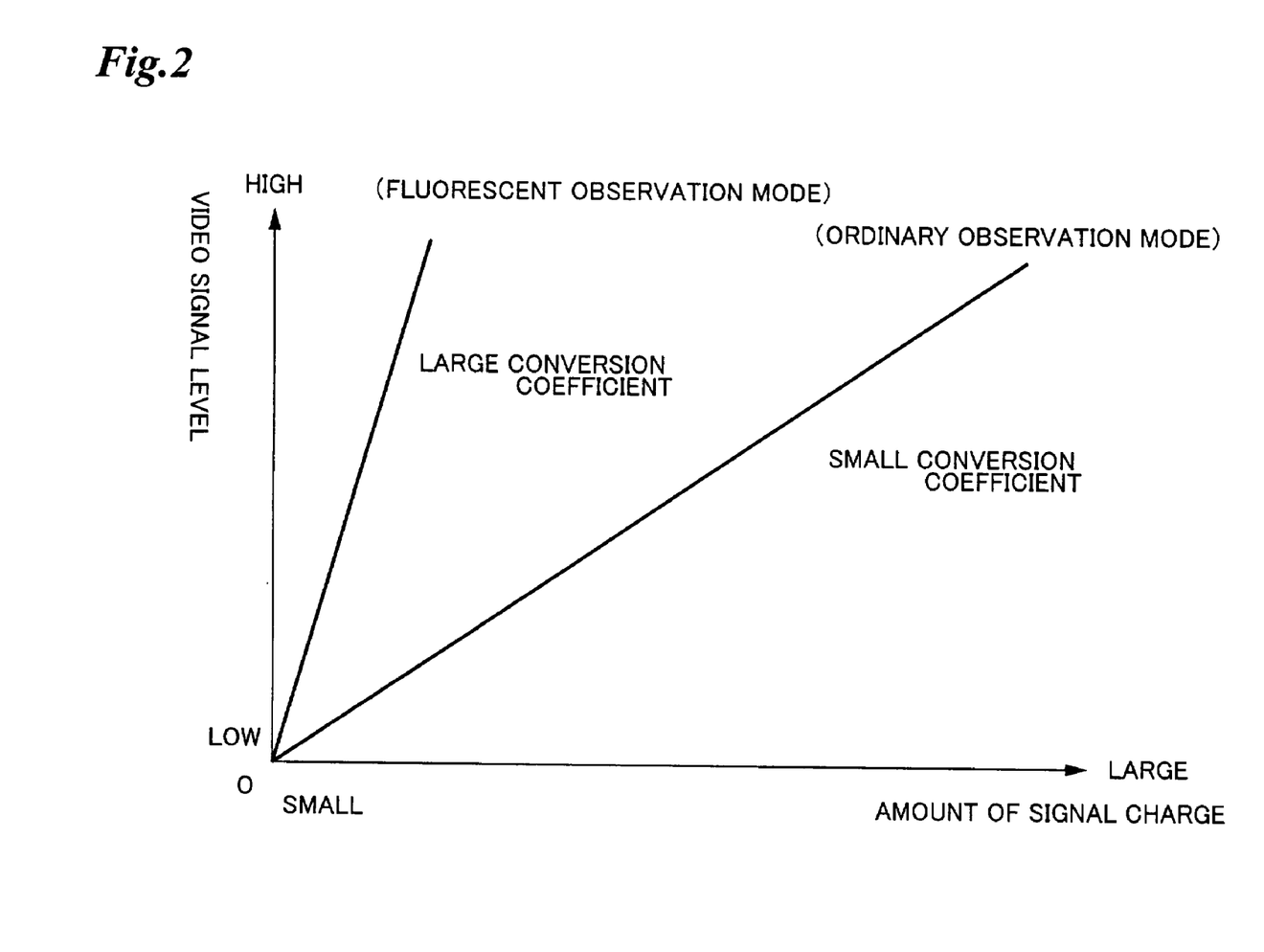
FIG. 2 is a graph illustrating the conversion coefficient of a floating diffusion amplifier.

FIG. 2 is a graph representing the conversion coefficients of the FDA 11 and FGA 12.

The FDA 11 has a comparatively small conversion coefficient and the FGA has a comparatively large conversion coefficient. For a signal charge of the same value, therefore, the level of the video signal obtained by the conversion by FGA 12 will be greater than the level of the video signal obtained by the conversion by FDA 11. Thus the level of the video signal output from the CCD 1 can be adjusted even though the charge multiplying drive pulses applied to the charge multiplier 8 included in the CCD 1 are not changed.

In a case where the CCD 1 is utilized in an endoscope apparatus capable of being set to the ordinary observation mode and fluorescent observation mode, as described later, the output of the FDA 11 is selected and converted to a video signal (ordinary video signal). When the fluorescent observation mode has been set, the FGA 12 is turned on to make the conversion to the video signal (fluorescent video signal). The signal charge obtained in the fluorescent observation mode generally is very weak (the amount of signal charge is small). However, since the conversion to the video signal is performed using the FGA 12 having the large conversion coefficient, the subsequent signal conversion is comparatively easy to carry out.

With reference again to FIG. 1, a changeover control signal is applied to the FDA 11 and FGA 12 via the inverter 9. The FDA 11 or FGA 12 is turned on based upon the changeover control signal to convert the applied signal charge to a video signal.

In the CCD 1 described above, the photoreceptor area 2, frame transfer area 5, horizontal transfer line 6, charge sweep-out drain 7, charge multiplier 8, FDA 11, FGA 12 and selector 9 are formed on a single substrate (wafer). It goes without saying, however, that at least one of the FDA 11 and FGA 12 can be provided external to the substrate.

Figure 3:
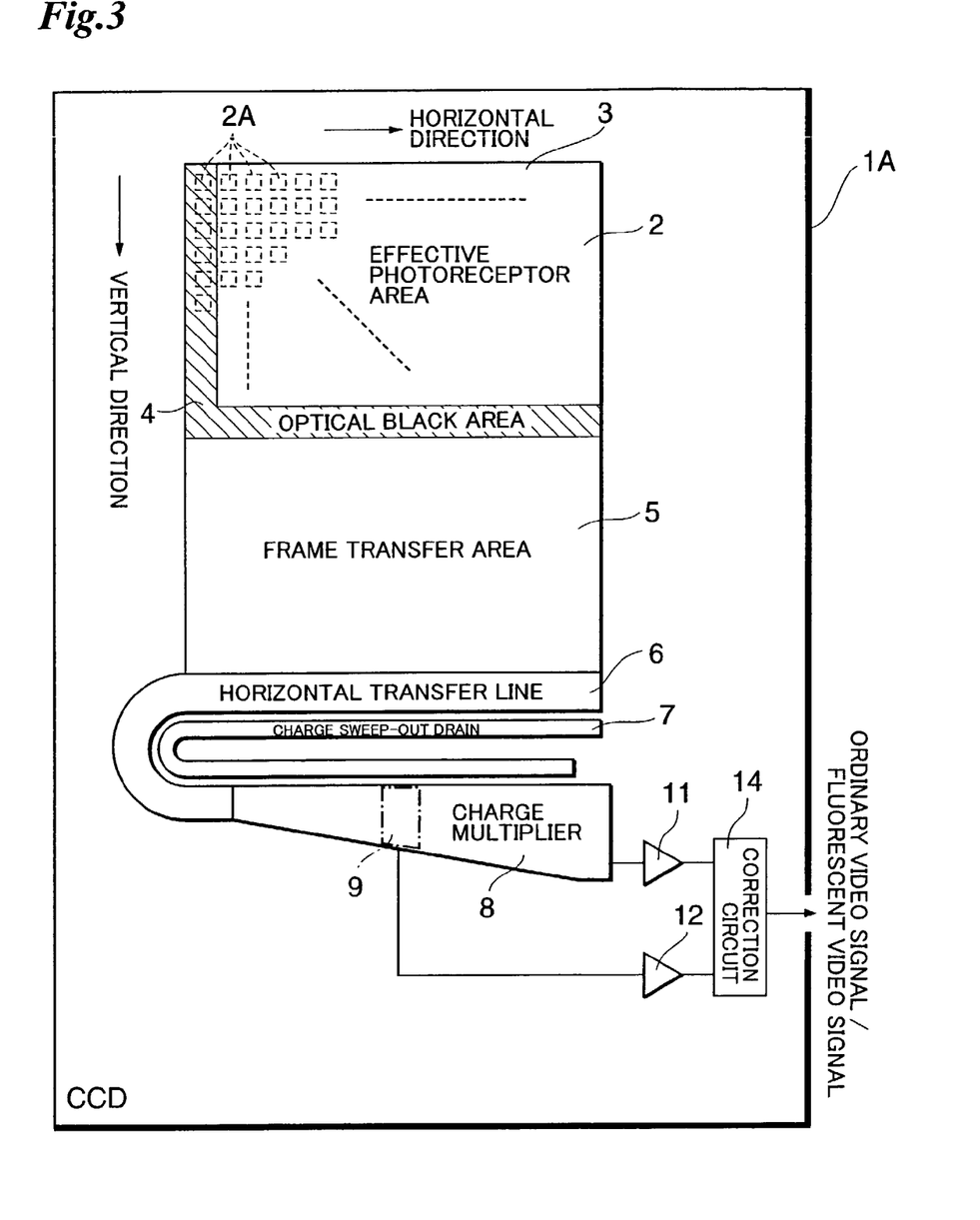
FIG. 3 is a diagram illustrating the structure of a CCD according to a second embodiment of the present invention.

FIG. 3 illustrates the structure of a CCD according to a second embodiment of the present invention. Components in FIG. 3 identical with those shown in FIG. 1 are designated by like reference characters and need not be described again.

In the first embodiment, the FDA and FGA, which have different conversion coefficients, and the selector are provided. In this embodiment, however, a correction circuit 14 is provided instead of the selector.

Here a CCD 1A is such that the photoreceptor area 2, frame transfer area 5, horizontal transfer line 6, charge sweep-out drain 7, charge multiplier 8, FDA 11, FGA 12 and correction circuit 14 are formed on one substrate (wafer). It goes without saying, however, that the correction circuit 14 may be formed external to the CCD 1A.

The FDA 11 has a charge-to-voltage conversion coefficient k1, and the FGA 12 has a charge-to-voltage conversion coefficient k2. Furthermore, the positions of the respective floating electrodes are the $n1^{th}$ and $n2^{th}$ stages. The FDA 11 and FGA 12 convert the numbers of electric charges underlying these electrodes to voltages and output the voltages as V1 and V2, respectively. The values of these two outputs are as follows:

$$V1 = N \times x^{n1} \times k1$$

$$V2 = N \times x^{n2} \times k2$$

where x represents the magnification factor and N the number of electric charges produced by the photoelectric transducers. The correction circuit 14 calculates the value of N as follows based upon the above equations:

$$N = \frac{V2}{k2 \cdot \exp\left\{\frac{n2}{n1-n2} \cdot l_n\left(\frac{V1 \cdot k2}{k1 \cdot V2}\right)\right\}}$$

The calculation performed by the correction circuit 14 does not include the multiplication factor x. Even if the multiplication factor fluctuates, therefore, the output of the correction circuit 14 will be the number of detected electric charges produced by the photoelectric transducers. The correction circuit 14 may perform an analog operation or may execute an analog-to-digital conversion in an internal A/D converter and perform a digital operation.

In this case, the count of electric charge produced by the photoelectric transducers can be calculated even if the charge multiplication factor fluctuates in the charge multiplier 8.

Figure 4:
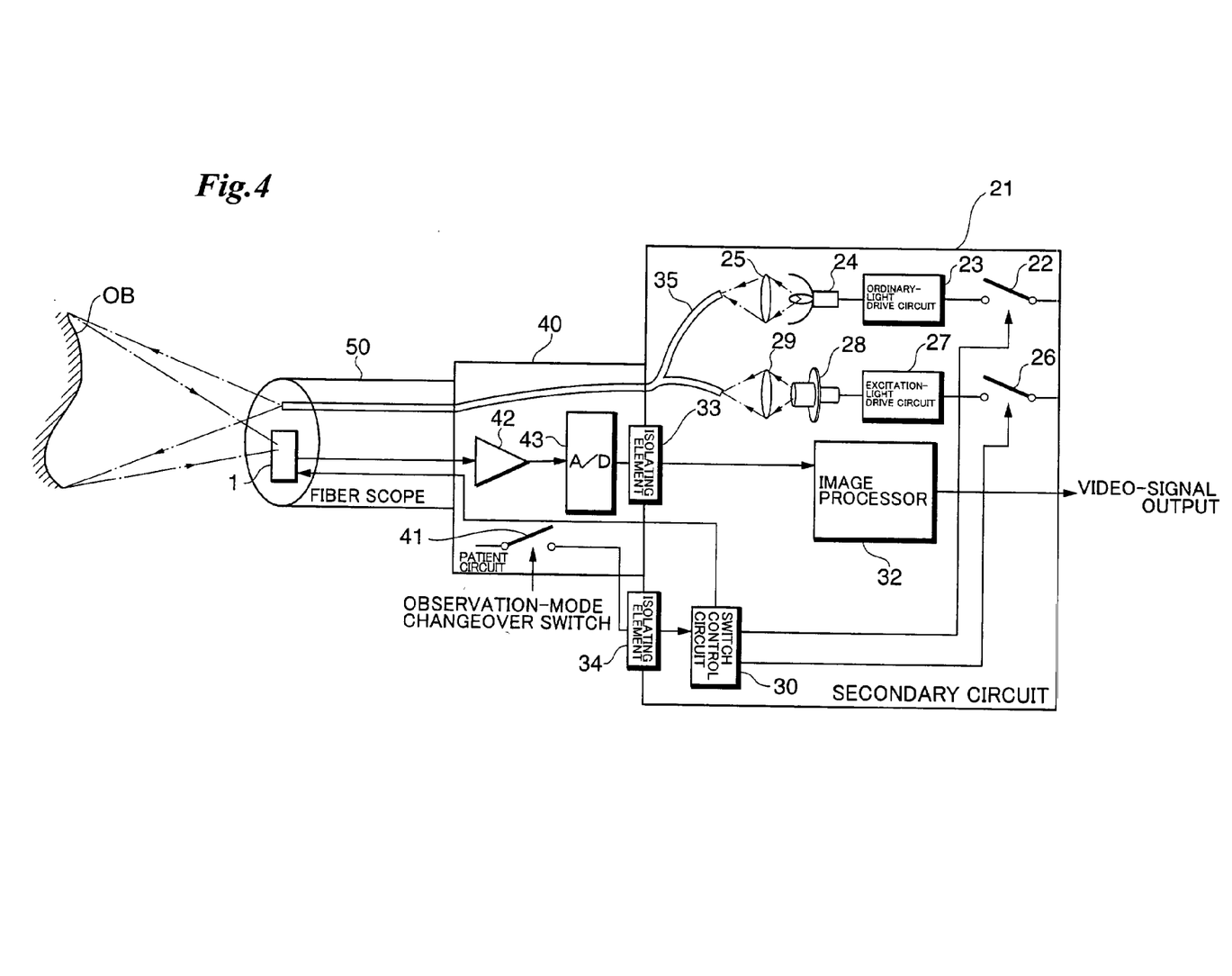
FIG. 4 is a block diagram illustrating the electrical structure of an endoscope apparatus using the CCD of the first embodiment.

FIG. 4 is a block diagram illustrating the electrical structure of an endoscope apparatus that uses the CCD 1 shown in FIG. 1.

As shown in FIG. 4, the endoscope apparatus comprises a secondary circuit 21, a patient circuit (primary circuit) 40 and an elongated, flexible electronic scope 50. The secondary circuit 21 and patient circuit 40 are placed on a table or the like and are operated by a physician. When a patient lies down on a bed and the patient's stomach lining, for example, is to be imaged as internal tissue, the physician inserts the electronic scope 50 from the patient's mouth. The electronic scope 50 is passed through the esophagus until the tip of the electronic scope 50 reaches the interior of the stomach. The tip of the electronic scope 50 is provided with the above-described CCD 1 for sensing the image of the stomach lining, which represents internal tissue OB.

The endoscope apparatus can be set to two observation modes, namely an ordinary observation mode and a fluorescent observation mode. The ordinary observation mode is for sensing the image of the internal tissue OB by illuminating it with white light. The fluorescent observation mode is for sensing the image of the internal tissue OB by illuminating it with excitation light.

The patient circuit 40 is provided with a observation-mode changeover switch 41, which is turned on and of by the physician operating the endoscope apparatus. The fluorescent observation mode is established by turning on the observation-mode changeover switch 41, and the ordinary observation mode is established by turning off the observation-mode changeover switch 41.

A signal indicating the on/off state of the observation-mode changeover switch 41 is input to a switch control circuit 30 of the secondary circuit 21 via an isolating element (photocoupler) 34. Switch circuits 22 and 26 included in the secondary circuit 21 are controlled by the switch control circuit 30 in such a manner that the switch circuit 26 is turned on when the observation-mode changeover switch 41 is turned on and the switch circuit 22 is turned on when the observation-mode changeover switch 41 is turned off.

When the switch circuit 22 is turned on, an ordinary light source (white-light source) 24 is caused to emit white light by a drive circuit 23 for ordinary light. The white light is introduced to the rear end face (the face on the side of the secondary circuit 21) of a light guide 35, which is disposed within the patient circuit 40 and electronic scope 50, by a condensing lens 25.

When the switch circuit 26 is turned on, an excitation light source 28 is caused to emit excitation light, which has a wavelength characteristic in the excitation-wavelength region of the internal tissue, by a driving circuit 27 for excitation light. (It may be so arranged that the excitation light source 28 emits near infrared light.) The excitation light is introduced to the rear end face of the light guide 35 by a condensing lens 29.

The illuminating light (white light or excitation light) propagates through the interior of the light guide 35 and emerges from the front end of the light guide 35. An illumination lens (not shown) is placed in front of the front end face of the light guide 31. The light emitted from the light guide 31 illuminates the internal tissue OB owing to the illumination lens.

Light reflected from the internal tissue OB is condensed by an objective lens (not shown). (When excitation light emerges from the light guide 31, then the internal tissue OB produces self-fluorescence as the reflected light.) As a result, an image representing the internal tissue OB is formed on the photoreceptor surface of a CCD 1. A video signal representing the image of the internal tissue OB is output from the CCD 1.

As mentioned above, the CCD 1 includes the FDA 11 and FGA 12, whose conversion coefficients differ. The switch control circuit 30 included in the secondary circuit 21 outputs a changeover control signal in accordance with the mode that has been sent and applies this signal to the CCD 1. When the ordinary observation mode has been set, the FDA 11 having the small conversion coefficient effects a conversion to a video signal to provide an ordinary video signal. When the fluorescent observation mode has been set, the FGA 12 having the large conversion coefficient effects a conversion to a video signal to provide a fluorescent video signal. Even if only a very weak signal charge is obtained in the fluorescent observation mode, a fluorescent video having a high level is obtained.

The video signal output from the CCD 1 is input to an amplifier 42 in the patient circuit 40. The amplifier 42 amplifies the video signal, and the amplified signal is converted to digital image data in an analog/digital converter 43. The digital image data is input to an image processor 32 in the secondary circuit 21 via an isolating element 33.

The image processor 32 executes predetermined image processing, such as white balance adjustment, gamma correction and digital-to-analog conversion, and outputs the processed signal as a video signal. The video signal output from the image processor 32 is applied to a display unit (not shown), whereby an image representing the internal tissue OB is displayed on the display screen of the display unit.

Figure 5:
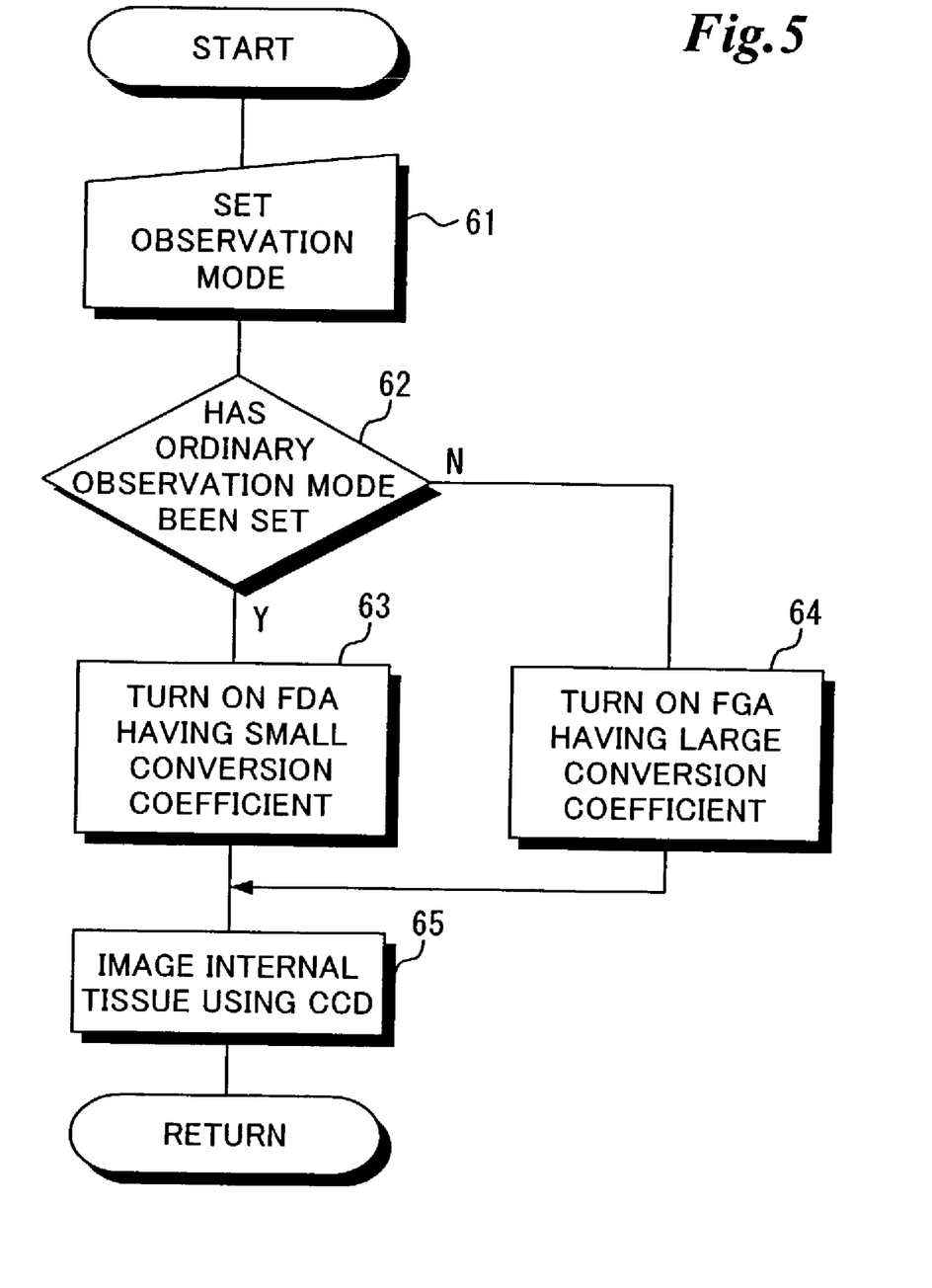
FIG. 5 is a flowchart illustrating processing conforming to the modes of the endoscope apparatus.

FIG. 5 is a flowchart illustrating processing conforming to the observation mode to which the endoscope apparatus has been set.

Either the ordinary observation mode or fluorescent observation mode is set by the observation-mode changeover switch 41 (step 61). If the ordinary observation mode is set ("YES" at step 62), then the FDA 11 having the large conversion coefficient is turned on (step 63). Next, the internal tissue OB is imaged using the CCD 1, whereby an ordinary video signal is obtained (step 65). Since the amount of signal charge stored in the photodiodes 2A by sensing the image of the internal tissue illuminated by the ordinary light is comparatively large, the level of the video signal becomes comparatively high even though the conversion coefficient is small.

If the fluorescent observation mode is set ("NO" at step 62), then the FGA 12 having the small conversion coefficient is turned on (step 64).

Next, the internal tissue OB is imaged using the CCD 1, whereby a fluorescent video signal is obtained (step 65). Though the amount of signal charge stored in the photodiodes 2A by sensing the image of the internal tissue illuminated by the fluorescent light is comparatively small, a conversion is made to the video signal by the FDA 12 having the large conversion coefficient and therefore the level of the fluorescent video signal becomes comparatively high.

Thus, a fluorescent video signal having a comparatively high level can be obtained without changing the charge multiplying drive pulses of the charge multiplier 8 in CCD 1. Since it is unnecessary to change the charge multiplying drive pulses, it is possible to prevent a variation in the multiplication factor of the charge multiplier 8 due fluctuation of the charge multiplying drive pulses.

As many apparently widely different embodiments of the present invention can be made without departing from the spirit and scope thereof, it is to be understood that the invention is not limited to the specific embodiments thereof except as defined in the appended claims.

What is claimed is:

1. A charge multiplying solid-state electronic image sensing device comprising:
    a number of photoelectric transducers for storing signal charge in accordance with amount of incident light;
    a read-out device for reading out signal charge that has been stored in said photoelectric transducers;
    a charge multiplier for transferring the signal charge, which has been read out by said read-out device, while multiplying the electric charge;
    a converter for converting the signal charge, which has been transferred through said charge multiplier, to a video signal in accordance with a first conversion coefficient in response to setting of a first mode, and to a video signal in accordance with a second conversion coefficient, which is different from the first conversion coefficient, in response to setting of a second mode; and
    a calculation device for calculating amount of signal charge that has been stored in said photoelectric transducers based upon two video signals resulting from the conversion performed by said converter, the first conversion coefficient, the second conversion coefficient and number of multiplying stages of said charge multiplier.

2. The device according to claim 1, wherein said converter includes two floating gate amplifying circuits for performing a conversion in accordance with the first and second conversion coefficients, or a floating gate amplifying circuit having the first conversion coefficient and a floating diffusion amplifying circuit having the second conversion coefficient for performing the conversion in accordance with the first and second conversion coefficients.

3. An endoscope apparatus comprising:
    an excitation light source for emitting excitation light of a wavelength within an excitation-wavelength region of internal tissue, which produces fluorescence, in response to setting of a fluorescent observation mode;
    a white-light source for emitting white light in response to setting of an ordinary observation mode; and
    a solid-state electronic image sensing device, which receives fluorescent light emitted from the internal tissue owing to illumination of the internal tissue with the excitation light, or reflected light from the internal tissue owing to illumination of the internal tissue with the white light, for outputting a video signal representing an image of the internal tissue;
    wherein the charge multiplying solid-state electronic image sensing device set forth in claim 1 is used as said solid-state electronic image sensing device;
    an output from said charge multiplying solid-state electronic image sensing device; being selected in such a manner that the larger of the first and second conversion coefficients is adopted in response to setting of the fluorescent observation mode and the smaller of the first and second conversion coefficients is adopted in response to setting of the ordinary observation mode.

4. A method of controlling a charge multiplying solid-state electronic image sensing device having a number of photoelectric transducers for storing signal charge in accordance with amount of incident light, a read-out device for reading out signal charge that has been stored in the photoelectric transducers, and a charge multiplier for transferring the signal charge, which has been read out by the read-out device, while multiplying the electric charge, said method comprising the steps of:

converting the signal charge, which has been transferred through the charge multiplier, to a video signal in accordance with a first conversion coefficient in response to setting of a first mode, and converting the signal charge, which has been transferred through the charge multiplier, to a video signal in accordance with a second conversion coefficient, which is different from the first conversion coefficient, in response to setting of a second mode; and calculating the amount of signal charge that has been stored in said photoelectric transducers based upon two video signals resulting from the conversion, the first conversion coefficient, the second conversion coefficient and number of multiplying stages of said charge multiplier.

5. The device according to claim 1, wherein the charge multiplier uses a plurality of charge multiplying drive pulses to magnify the signal charge, and wherein the plurality of charge multiplying drive pulses remains constant in both the first mode and the second mode.

6. The device according to claim 1, further comprising a charge drain which removes unnecessary charge read out by the read-out device.

* * * * *